Oct. 7, 1924.   1,511,138
J. J. RIEDER ET AL
ELECTRICALLY DRIVEN DEVICE
Original Filed Aug. 24, 1923   4 Sheets-Sheet 1
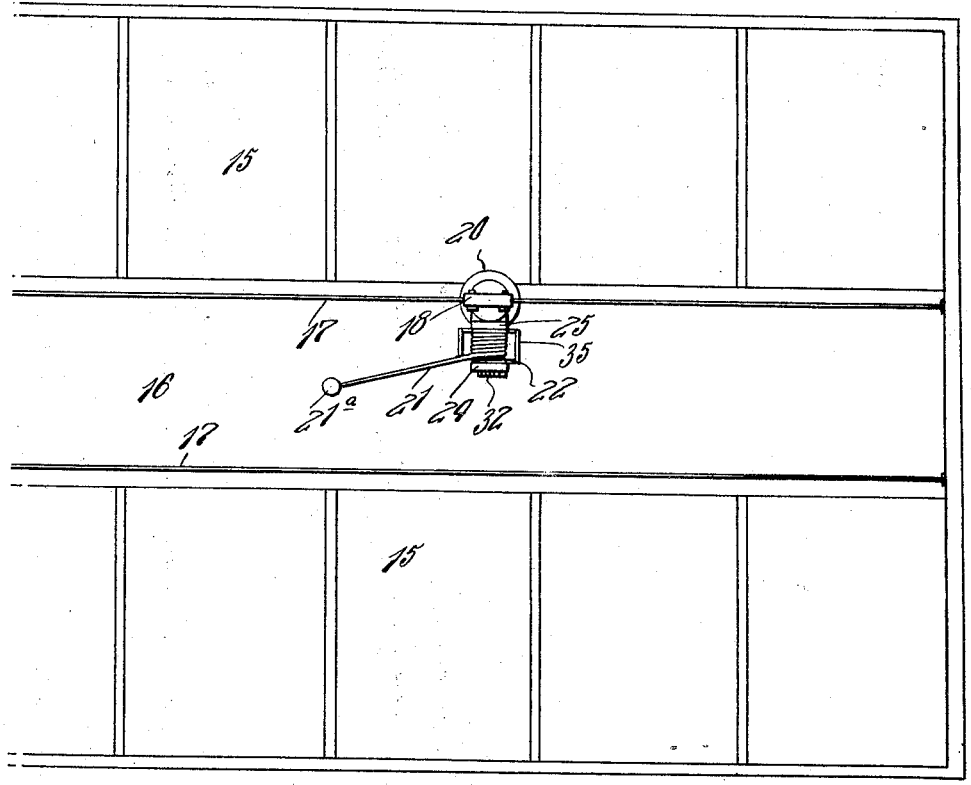
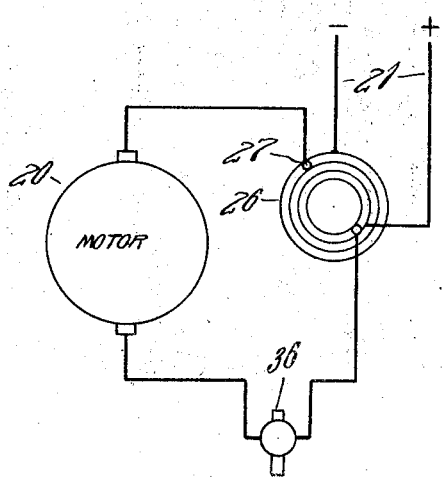
J. J. Rieder
H. G. Hoesly
Inventors
By Victor J. Evans
Attorney Oct. 7, 1924.  
J. J. RIEDER ET AL  
ELECTRICALLY DRIVEN DEVICE  
Original Filed Aug. 24, 1923    4 Sheets-Sheet 2

1,511,138

J. J. Rieder  
H. G. Hoesly  
Inventor

By Victor J. Evans  
Attorney

Oct. 7, 1924.  
J. J. RIEDER ET AL  
1,511,138  
ELECTRICALLY DRIVEN DEVICE  
Original Filed Aug. 24, 1923   4 Sheets-Sheet 3
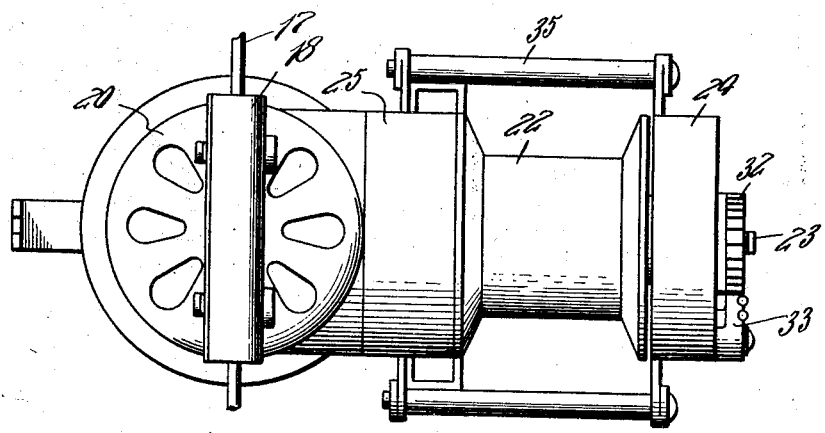
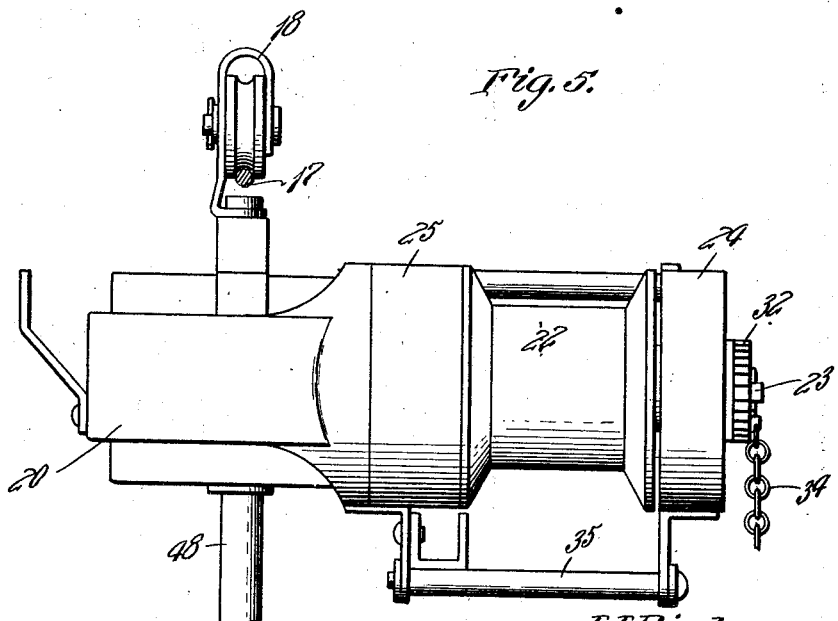

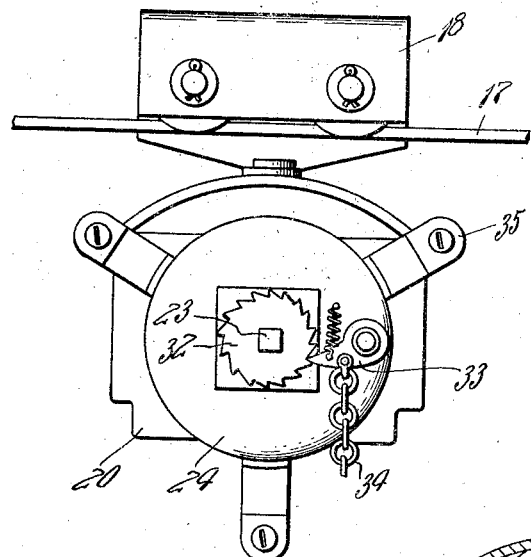
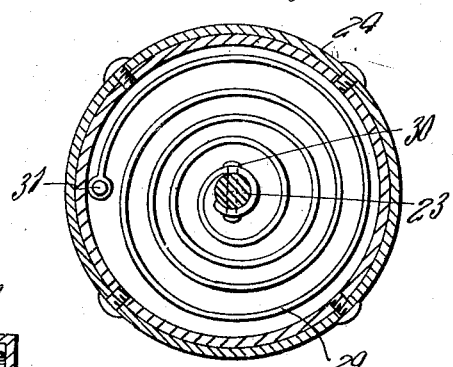
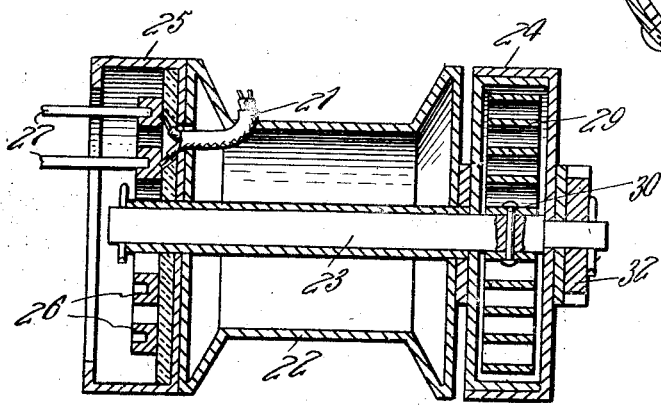

Patented Oct. 7, 1924.

1,511,138

UNITED STATES PATENT OFFICE.

JACOB J. RIEDER AND HENRY G. HOESLY, OF NEW GLARUS, WISCONSIN.

ELECTRICALLY-DRIVEN DEVICE.

Original application filed August 24, 1923, Serial No. 659,240. Divided and this application filed January 19, 1924. Serial No. 687,307.

*To all whom it may concern:*

Be it known that we, JACOB J. RIEDER and HENRY G. HOESLY, citizens of the Republic of Switzerland, residing at New Glarus, in the county of Green and State of Wisconsin, have invented new and useful Improvements in Electrically-Driven Devices, of which the following is a specification.

This invention relates generally to portable electrically operated machines and has particular relation to means whereby machines or devices of this character may be operated, the present application being a division from an application filed by us August 24, 1923, which application bears the Serial No. 659,240.

An object of the present invention is the provision of means whereby a motor driven machine or device may be easily and quickly moved an appreciable distance and thereafter returned to its original position, means being provided whereby initial movement of the machine or device will cause a storing of energy which may be subsequently utilized for moving the device in an opposite direction.

With the above and other objects in view, the invention further includes the following novel features and details of construction, to be hereafter more fully described, illustrated in the accompanying drawings and pointed out in the appended claims.

In the drawings:—

Figure 1 is a diagrammatic view illustrating a plurality of stalls in a stable or barn and showing the invention.

Figure 4 is a top plan view showing the driving motor and the drum for the take-up cable.

Figure 5 is a side elevation view of the subject matter of Figure 4.

Figure 6 is an end view.

Figure 7 is a longitudinal sectional view showing the spring actuated drum for the take-up cable.

Figure 8 is a transverse section through the spring housing.

Figure 9 is a diagram showing the wiring of the motor circuit.

Figure 2:
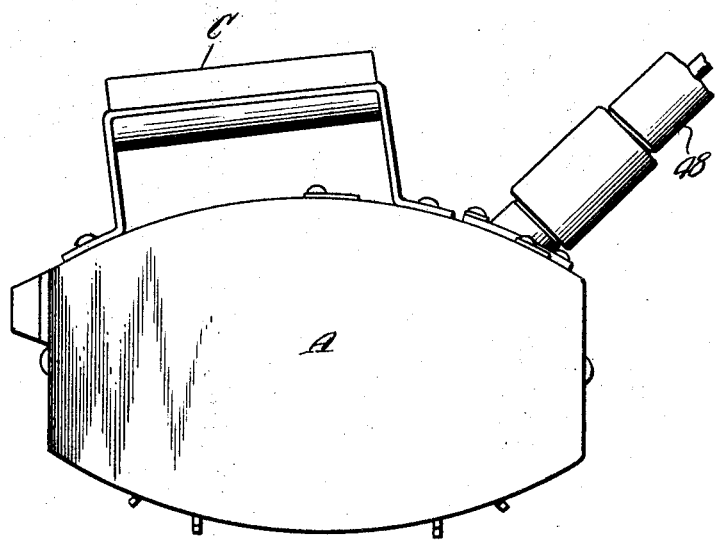
Figure 2 is a side elevation of a motor driven curry comb which may be operated by means of the present invention.
Figure 3:
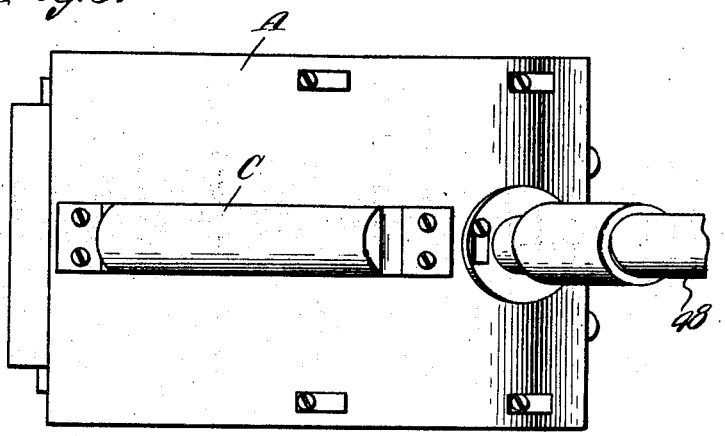
Figure 3 is a top plan view of the same.

The invention which is illustrated as used within a barn is also illustrated in connection with a motor driven curry comb, the latter forming the subject matter of the application above referred to. This curry comb is illustrated generally in Figures 2 and 3 of the drawings and comprises a housing A which encloses the curry comb mechanism, the latter being driven through a flexible shaft 48, while the casing or housing is provided with a handle or grip C.

The stalls of the stable or barn are indicated at 15 and are divided by a central passage or aisle 16. Suitably supported above this passage 16 are tracks, herein shown in the form of a wire or cable 17. The tracks being a duplicate so that the device can be conveniently used on the animals in each row of stalls. Operating along this track is a carriage 18 from which is hung as shown at 19, an electric motor 20. This motor is thus movable along the track 17 and current for its operation is supplied from a suitable source through a cable 21. One end of this cable is anchored as at 21ª and this anchor may be in the form of a suitable plug or connection with a source of current.

Carried by the motor 20 is a spool or drum 22 upon which the cable 21 is adapted to be wound. This spool or drum is mounted upon a shaft 23 between the housings 24 and 25. Located within the last mentioned housing are collector rings 26 to which individual conductor wires included in the cable 21, are connected. The collector rings 26 are in electrical connection with the motor 20 by means of brushes or other contact devices 27 which are received within the annular grooves formed therein, as clearly shown in Figure 2 of the drawings.

The housing 24 encloses a spring 29 which has its inner end connected to the shaft 23, as shown at 30 and its opposite end connected to the housing 24, as shown at 31. Mounted upon the shaft 23 which extends through the housing 24 is a toothed wheel 32, the latter being adapted to be engaged by a dog 33 so as to prevent rotation of the shaft and consequently the drum or spool 22 in one direction, that is in a direction to unwind the spring. A chain or cord 34 is connected to the dog and extends downwardly to within convenient reach of an operator, whereby the toothed wheel 32 may be released and the drum or spool 22 rotated, under the influence of the spring 29.

The housings 24 and 25 are held in spaced relation at opposite ends of the spool or drum 22 through the medium of spacing arms 35, one end of the said arms being also connected to the housing of the motor 20, so that the drum or spool is supported by the motor. A suitable switch 36 arranged in convenient reach of the operator controls the operation of the motor.

While the invention is illustrated in connection with a curry comb, it is apparent that it may be used in connection with any motor driven or electrically operated device or machine and when arranged within a barn as illustrated in the drawings, the motor and the machine operated thereby are normally positioned centrally of the length of the barn and may be moved along the track in either direction to reach any of the stalls. The flexible shaft 48 is of sufficient length to reach the stalls upon the opposite sides of the central passage. As the machine is moved in one direction by a pull upon the shaft 48, the conductor cable 21 will be unwound from the spool or drum 22, the ratchet arrangement of the toothed wheel 32 and the dog 33 permitting free rotation of the drum or spool in one direction. When moving in this direction the spring is tensioned. When it is desired to move the machine in an opposite direction, the chain or cable 34 is pulled to disengage the dog from the toothed wheel 32, whereupon the spring 29 will automatically rewind the cable 21 upon the drum and as one end of the cable is anchored, the energy of the spring will move the motor along the track, the movement continuing as long as the dog is disengaged from the toothed wheel. In addition to a conductor, the cable 21 also serves as a take up cable. As soon as the chain is released the dog will engage the toothed wheel and stop the movement of the motor along the track.

The invention is susceptible of various changes in its form, proportions and minor details of construction and the right is herein reserved to make such changes as properly fall within the scope of the appended claims.

Having described the invention what is claimed is:—

1. In combination with an electrically operated device, a motor, a track, means connecting the motor and track whereby the former may be moved over the track, means operatively connecting the device and motor, an electric conductor cable for the motor, a spring actuated spool carried by the motor for receiving the cable, a toothed wheel rotatably mounted with the spool and a dog associated with the toothed wheel to hold said spool against rotation by the spring and means whereby the spool may be released from the holding means.

2. In combination with an electrically operated device, a track, a motor movable along the track, means operatively connecting the device and motor, spaced supporting members carried by the motor, said members including compartments, a coiled spring located within one compartment and operatively connected to the spool for rotating the latter in one direction, means for holding the spool against such rotation, means whereby the holding means may be released and means carried by the spool and arranged in the other compartment to provide an electric connection between the conductor and motor.

In testimony whereof we affix our signatures.

JACOB J. RIEDER.
HENRY G. HOESLY.